US012729617B2

(12) United States Patent
Beletskaya et al.

(10) Patent No.: US 12,729,617 B2
(45) Date of Patent: Sep. 8, 2026

(54) METHOD FOR HYDRAULIC FRACTURING OF CONVENTIONAL AND UNCONVENTIONAL RESERVOIRS BY INTRODUCING ENERGIZED FLUID

(71) Applicant: Schlumberger Technology Corporation, Sugar Land, TX (US)

(72) Inventors: Anna Beletskaya, Sugar Land, TX (US); Samuel Danican, Sugar Land, TX (US); Patrice Abivin, Houston, TX (US); Timothy Lesko, Houston, TX (US); Gustavo Plaza, Sugar Land, TX (US); Herbe Gomez Conzatti y Martinez, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 43 days.

(21) Appl. No.: 18/745,460

(22) Filed: Jun. 17, 2024

(65) Prior Publication Data

US 2024/0418068 A1 Dec. 19, 2024

Related U.S. Application Data

(60) Provisional application No. 63/508,794, filed on Jun. 16, 2023.

(51) Int. Cl.
*E21B 43/267* (2006.01)
*C09K 8/70* (2006.01)
*C09K 8/80* (2006.01)

(52) U.S. Cl.
CPC ............ *E21B 43/267* (2013.01); *C09K 8/703* (2013.01); *C09K 8/805* (2013.01)

(58) Field of Classification Search
CPC ........ E21B 43/267; C09K 8/703; C09K 8/805
See application file for complete search history.

(56) References Cited

U.S. PATENT DOCUMENTS 7,781,380 B2 8/2010 Lin
7,998,909 B2 8/2011 Lin
(Continued)

FOREIGN PATENT DOCUMENTS

CN 102766450 B 3/2014
WO 2007086771 A1 8/2007
(Continued)

OTHER PUBLICATIONS

Faroughi, S. A. et al., "The Rheological Behavior Of Energized Fluids And Foams With Application To Hydraulic Fracturing: Review", Journal of Petroleum Science and Engineering, 2018, pp. 243-263, vol. 163.

(Continued)

*Primary Examiner* — Crystal J Lee
(74) *Attorney, Agent, or Firm* — Jeffrey D. Frantz

(57) ABSTRACT

Systems, compositions, apparatus, and methods for hydraulically fracturing a subterranean formation traversed by a wellbore including mixing a gelling agent and water to form a base fluid, adding a gas and a proppant to the base fluid to form a foam fluid, alternating injecting into the formation the base fluid and the foam fluid, repeating the alternating injecting, forming regions of higher proppant concentration, and forming channels adjacent to the regions. Systems, compositions, apparatus, and methods for hydraulically fracturing a subterranean formation traversed by a wellbore including forming a base fluid with a gelling agent, forming a foam fluid with a gas and a proppant, injecting into the formation the base fluid, injecting into the formation the foam fluid, repeating the injecting the base fluid and foam fluid, and forming channels in the base fluid with faster flow than flow in the foam fluid.

17 Claims, 3 Drawing Sheets

(56) References Cited

U.S. PATENT DOCUMENTS

| | | | |
|---|---|---|---|
| 8,916,507 B2 | 12/2014 | Lin | |
| 9,103,202 B2 | 8/2015 | Miquilena | |
| 9,695,353 B2 | 7/2017 | Nelson | |
| 10,072,478 B2 | 9/2018 | Gupta | |
| 10,717,919 B2 | 7/2020 | Germack | |
| 11,149,185 B2 | 10/2021 | Hernandez Altamirano et al. | |
| 2011/0265997 A1 | 11/2011 | Miquilena | |
| 2011/0315384 A1 | 12/2011 | Miquilena | |
| 2015/0167443 A1* | 6/2015 | Litvinets | C09K 8/805 166/280.1 |
| 2016/0017216 A1 | 1/2016 | Miquilena | |
| 2016/0153273 A1* | 6/2016 | Nguyen | C09K 8/5758 166/243 |
| 2017/0121593 A1* | 5/2017 | Pantsurkin | E21B 43/267 |
| 2018/0298271 A1* | 10/2018 | Auzerais | C09K 8/703 |
| 2019/0106619 A1* | 4/2019 | Nguyen | E21B 21/003 |
| 2021/0215028 A1* | 7/2021 | Sun | E21B 43/2605 |

FOREIGN PATENT DOCUMENTS

| | | |
|---|---|---|
| WO | 2011161573 A2 | 12/2011 |
| WO | 2014138445 A1 | 9/2014 |

OTHER PUBLICATIONS

Gandossi, L. et al., “An Overview Of Hydraulic Fracturing And Other Formation Stimulation Technologies For Shale Gas Production”, Publications Office of the EU, 2015, 62 Pages.

Montgomery, C.T. et al., “Hydraulic Fracturing: History of an Enduring Technology”, SPE-1210-0026-JPT, J Pet Technol, 2010, pp. 26-40, vol. 62, No. 12.

Tariq, Z, et al., “An Experimental Study To Reduce The Fracture Pressure Of High Strength Rocks Using A Novel Thermochemical Fracturing Approach”, Geofluids, Article ID 1904565, 2019, 16 Pages.

* cited by examiner

METHOD FOR HYDRAULIC FRACTURING OF CONVENTIONAL AND UNCONVENTIONAL RESERVOIRS BY INTRODUCING ENERGIZED FLUID

CROSS REFERENCE TO RELATED APPLICATION

This application claims priority to U.S. Provisional Patent App. No. 63/508,794 filed Jun. 16, 2023 with the same title. This application is incorporated herein by reference in its entirety.

BACKGROUND

This section is intended to introduce the reader to various aspects of the art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

One of the ways to reduce water consumption in hydraulic fracturing is the application of energized fluids or foam as a fracturing fluid. Foam comprises a large amount of gas and a small amount of liquid. Thus, the interest of service companies and operators toward foam fracturing fluid as a water-conservative well stimulation solution keeps rising.

Foam is a fluid composed of two immiscible liquid and gas phases. Gas is dispersed inside an aqueous (continuous) phase forming bubbles. Even though at high stress conditions bubbles are deformed, we will refer to them as bubbles herein. In the petroleum industry, gas volume fraction (Y) is sometimes referred to as "foam quality". FIG. 1 shows a schematic two-dimensional representation of a two-phase gas-liquid mixture. It also provides gas-liquid mixture classification based on the bubble volume fraction (Y) and some information about hydrodynamic interactions between bubbles and rheological behavior typical for each of the classes. In the petroleum literature, mixtures with gas volume fraction up to a wet limit ($\Psi t$), which is 63 to 74 percent, are referred to as "energized fluids." The term "foam" is restricted to the fluid with a gas bubble fraction between $\Psi t$ and a so-called dry limit, which is achieved at about 95 to 99 percent gas volume fraction. The region beyond the dry limit is known as mist.

$\Psi t$ is a threshold gas volume fraction at which the maximum possible volume of the dispersed phase is made of spherical bubbles. Any addition of the dispersed phase volume fraction beyond the wet limit results in osmotic pressure and distortion of the sphericity of bubbles to polyhedral. This value depends on the state of stress, bubble size distribution, and the presence or absence of randomness. The delineation for the monomodal dispersion of bubbles is 63-74 percent. The value of $\Psi t$ increases as modality (e.g., from monomodal to bimodal) increases. The dry limit is threshold beyond which the amount of fluid available to sustain the films network is not enough and the foam collapses.

More generally, one of the quality concerns in hydraulic fracturing is a screen out. Screen out is a condition that occurs when the solid proppant carried out in fracture treatment fluid creates a bridge across the perforations or similar restriction flow area. This results in a sudden and significant restriction to fluid flow that causes a rapid rise in pump pressure and fracturing job failure. While screenouts can occur at the perforation, screenouts more often occur with a bridge or restriction in the fracture network. This can be about ten or hundreds of feet from the perforations. This may eventually cause proppant to back up to the perforations and into the casing.

Some heterogeneous proppant placement methods include injection of proppant slurry and proppant-spacing filler material, which helps avoid proppant screen out. Traditionally, crosslinked-material is used to keep proppant suspended and sometimes high polymer loading or a highly viscosified fluid, such as viscoelastic surfactants like those in ClearFRAC™ commercially available from SLB of Sugar Land, Texas, is used instead of crosslinked material. One of the significant issues is that polymer residuals tend to be damaging for the formation resulting in reduced proppant pack conductivity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments herein relate to systems, compositions, apparatus, and methods for hydraulically fracturing a subterranean formation traversed by a wellbore including mixing a gelling agent and water to form a base fluid, adding a gas and a proppant to the base fluid to form a foam fluid, alternating injecting into the formation the base fluid and the foam fluid, repeating the alternating injecting, forming regions of higher proppant concentration, and forming channels adjacent to the regions. Embodiments herein relate to systems, compositions, apparatus, and methods for hydraulically fracturing a subterranean formation traversed by a wellbore including forming a base fluid with a gelling agent, forming a foam fluid with a gas and a proppant, injecting into the formation the base fluid, injecting into the formation the foam fluid, repeating the injecting the base fluid and foam fluid, and forming channels in the base fluid with faster flow than flow in the foam fluid. The gas may include nitrogen. In some embodiments, a pulse of the foam fluid has a duration of 5 to 300 seconds and a pulse of the base fluid has a duration of 5 to 300 seconds.

In some embodiments, the gelling agent includes polyacrylamide, polyacrylamide derivatives, guar, guar derivatives, viscoelastic surfactant, xanthan gum, hydroxyethyl cellulose, or a combination thereof.

The foam fluid may include a foaming agent or fibers. Further, the base fluid may include a foam stability control agent.

In some embodiments, the proppant may be coated or include silica sand, resin coated sands, sintered ceramic materials, fused synthetic ceramic materials, light weight nut shells, or a combination thereof.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Embodiments of the disclosure relate to a method of hydraulic fracturing of conventional and unconventional reservoirs for subsurface energy recovery. Embodiments of the disclosure discussed herein combine foam fracturing techniques with heterogeneous proppant placement in subterraneous fractures. In other words, some embodiments benefit from pulsing water solution of a gelling agent, a base fluid, with proppant and varying gas amount resulting in a foam fluid of varying foam quality. In some embodiments, the gas amount could be constant, but the stability of the foam generated with this gas can be altered. In some embodiments, the base fluid will have the proppant added to it. This will mix with the $N_2$ or $CO_2$ or a combination thereof gas at the wellhead, which results in a foamed fluid that then happens to have proppant mixed into it. That is, the proppant is not necessarily added to the foamed fluid, but rather in the generation of the foamed fluid, proppant has been mixed in from the pure liquid stream.

Embodiments herein relate to a method of hydraulic fracturing by alternating single-phase fluid, energized fluids, and foam flows with constant or varying gas content or foam stability. In some embodiments, the proppant is injected together with a foam fraction of a fluid or fraction of a fracturing fluid containing low foam quality (or energized), low foam stability, high foam quality, or high foam stability. In addition to reduction of water volume, foam fracturing provides benefits such as low leakoff, fracture growth facilitation, improved proppant transport, compatibility with water-sensitive formations, and low fracture conductivity damage. In some embodiments, the pulsing of the proppant is controlled, or the pulsing of the foam quality is controlled. Pulsing of the proppant may be controlled by opening and closing a physical gate, which restricts the addition of proppant to the blender tub before the fluid is sent to the pumps. The proppant concentration could also be controlled by pumping a proppant slurry downhole or recirculating it at the surface, while pumping another "clean", that is, proppant-free fluid stream to make up for the change in volumes. For the gas, a similar type of system of sending the gas downhole or into a recirculation loop in pulses may be effective. One may pulse the fibers or it may be operationally easier with additional benefits to keep fibers continuously introduced into the system.

Figure 1:
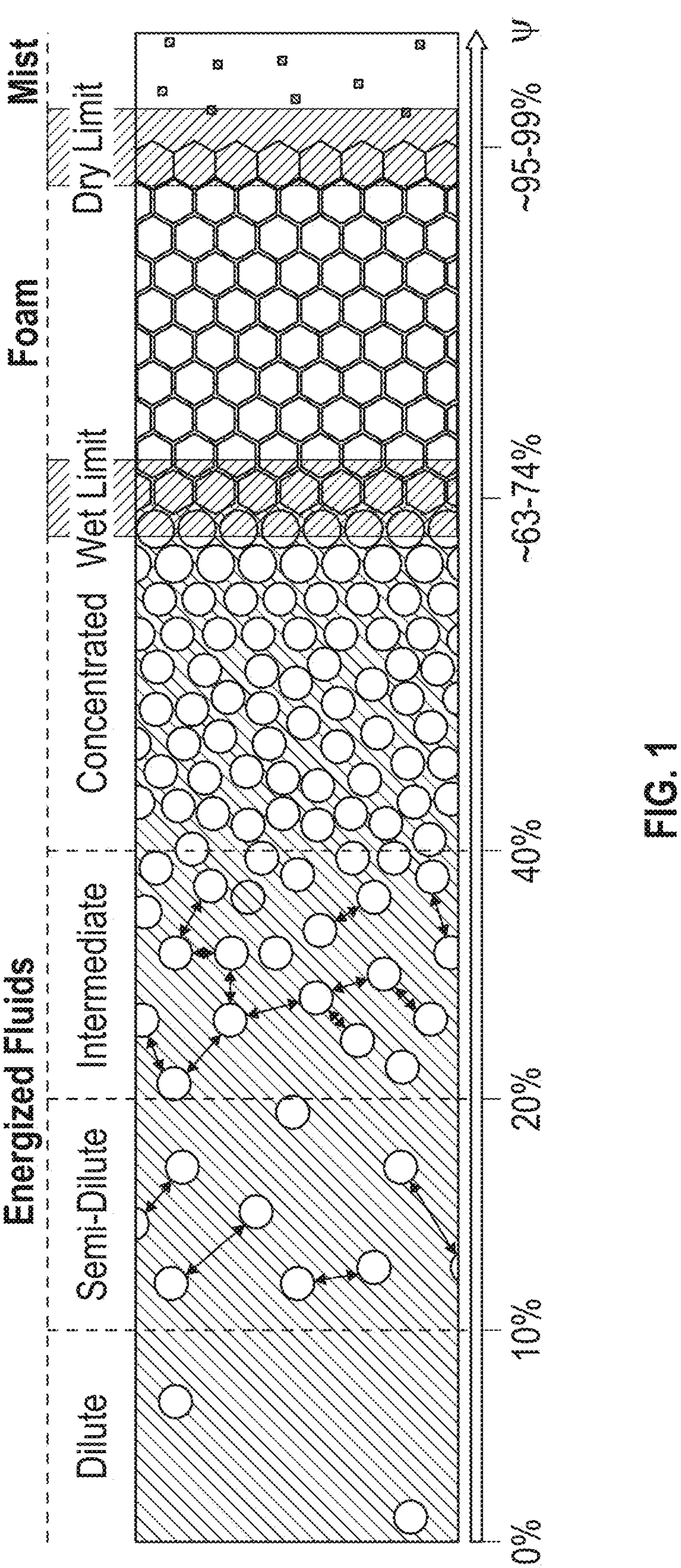
FIG. 1 is a schematic illustrating gas content and geometry of energized fluids.
Figure 2:
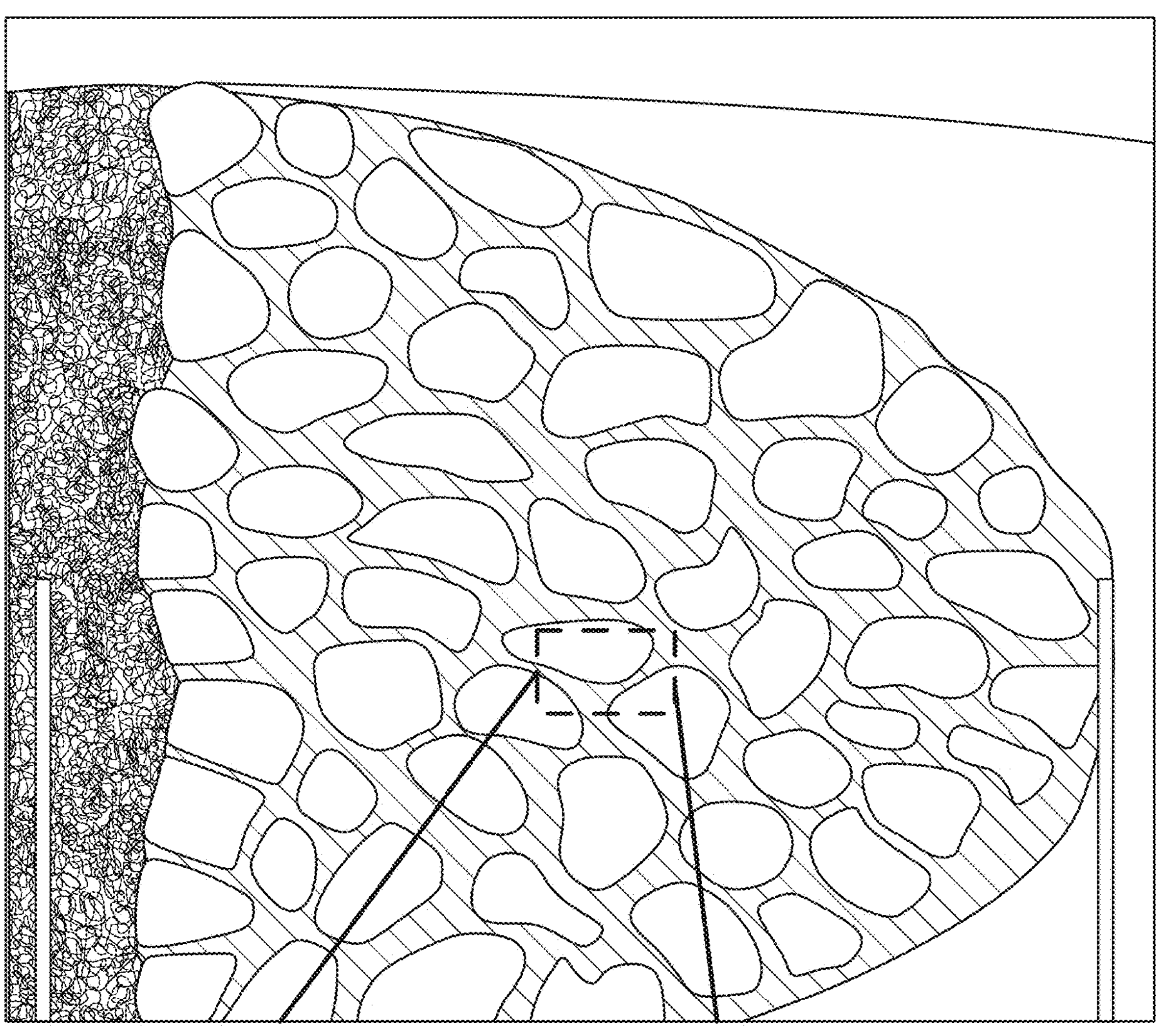
FIG. 2 is a diagram representing channels in a formation containing foam, in accordance with certain embodiments of the present disclosure.

FIG. 2 shows the formation of foam with proppant in pulsed agglomerated regions surrounded by channels with faster flowback with little or no proppant. The channels are formed due to the heterogeneous composition of the injected fluid. Part of the fluid carries proppant; part of the fluid does not carry proppant. It results in an inhomogeneous distribution of proppant within the fracture. The rate of proppant flow is very similar to the rate of fluid flow in all the directions. The impact of gravitation on proppant is limited while the fluid is stable. The fluids are designed to be stable until fracture collapse when pressure is no longer applied. When proppant is kept by stress applied from both sides of the fracture, the fluid needs to break (have low viscosity) so it may flow back and leave the space for hydrocarbons to flow. Hence, heterogeneous distribution of proppant results from injection with pulses. It stays heterogeneous because it is supported by fluid properties, then by stress applied within the fracture.

Wellsite logistics of gas is one of the disadvantages of many foam fracturing techniques. In this regard, utilization of nitrogen is more favorable compared to other gases. Nitrogen does not dissolve in water and has lower compressibility compared to $CO_2$, meaning that less gas needs to be used in the case of $N_2$ foam fracturing and the fluid proppant delivery characteristics are maintained. In some applications, nitrogen creates low hydrostatic pressure and cannot be applied for stimulation of deep wells. Both gases may be effective for shallow wells. Further, hydrostatic pressure is not the only parameter that determines the gas selection; elasticity may also be a factor in some embodiments. For deep wells, $CO_2$ may be selected. Nitrogen with pulses may be selected in some embodiments, so less nitrogen may extend the depth where nitrogen can be applied. That is, in embodiments using less nitrogen, the fluid is energized. However, if that reduced amount of gas is distributed homogenously, it might not be able to carry proppant. In the case of embodiments using pulses of nitrogen, the fluid has "islands" or regions with high concentration of bubbles, which may carry the proppant. In some embodiments, the gelling agent is polyacrylamide, polyacrylamide derivatives, guar, guar derivatives, viscoelastic surfactant, xanthan gum, hydroxyethyl cellulose, or a combination thereof.

In some embodiments, the foam fluid comprises a foaming agent, proppant, fibers, or a combination thereof. In some embodiments, the proppant comprises silica sand, resin-coated sands, sintered or fused synthetic ceramic materials, or lightweight nut shells. Fibers and other materials such as polylactic or polyglycolic acid (PLA or PGA) beads could be used as well. A variety of lightweight materials could be incorporated. A combination of any of these materials may also be selected for some embodiments. Some embodiments may use a proppant coated with a resin or other materials, which promotes adhesion. The resins used include urea-aldehyde resins, phenol-aldehyde resins, epoxy resins, furfuryl alcohol resins, and polyester or alkyl resins. The resins can be in pure form or mixtures containing curing agents, coupling agents, or other additives. Commercial products include CarboBOND™ and CarboBOND LITE™ from Carbo Ceramics of Houston, TX. Also, Hexion of Houston, TX sells a variety of resin-coated proppants such as PrimePlus™.

When pumped with fluids at ambient temperatures, the coated proppant particles are free flowing. However, once placed in the formation and exposed to the elevated temperatures from the downhole environment, the surface resin is activated and the individual grains of proppant begin to agglomerate into a larger structural mass or region. The bonds are sufficiently strong to limit proppant migration. This can both help in preventing proppant from being produced back up the wellbore, as well as assist in generating heterogeneous proppant concentrations within the fracture network. Some effective proppants with commercial trade names are, but not limited to, CarboProp G2, MaxPROP ISP G2, MaxPROP ISP TR. The proppant coating can be composed of, but not limited to, phenolic novolac complex, combination of phenolic novolac and epoxy adduct complex.

The density of the fluids, the chemical composition of the multiphase materials, and the proppant carrying capacity of the fluid may vary based on the chemicals present, the gas introduction pulses, and channel formation goals of any given workflow for a particular wellsite.

In some embodiments, a chemical agent, a foam stability control agent, is added to the base fluid, which renders the resulting foam fluid as more or less stable. In this way, the amount of foam would fluctuate, even if the quantity and rate of fluid and $N_2$ gas do not change. Additionally, when there is a "better foam", the sand concentration is more evenly spread throughout the foam, but when the foam quality suffers, the sand is more concentrated in the liquid phase. Defoamers can be a wide class of chemicals including mineral oil, silicone oil, hydrophobic silica, ethylene-bis-stearamide, fatty acids, fatty alcohols, etc. These chemicals cause the foam bubbles to be less stable, and more easily break. Silica organic polymer may be selected from some embodiments in a concentration of about 10 to about 30 weight percent. On the other hand, some effective silicone-based materials may work both as antifoams (foam preventers) and as defoamers (foam breakers).

Addition of surfactants to the foam is the most widely used approach for foam stabilization. They can be classified into four groups depending on the type of their head group: anionic surfactants (negatively charged), cationic surfactants (positively charged), nonionic surfactants (uncharged) and zwitterionic surfactants (containing both positive and negative charge). In sandstone reservoirs, anionic surfactants are recommended due to their little adsorption tendency in comparison to other surfactant types (cationic, nonionic, and zwitterionic). The role of surfactants in prevention of foam aging is as follows: a) constraint of bubble's coarsening and coalescence due to surfactants adsorption at solid-liquid interface, and b) decrease of drainage rate due to micelles self-assembly in the solution leading to the viscosity increase. Possible surfactants are, but not limited to cocamidopropyl betaine (CB), Ammonyx® an amphoteric surfactant from Stepan Oilfield Solutions of Houston, TX, lauryl/myristyl amidoamine oxide (LMDO), PETROSTEP® SB which is a hydroxysultaine commercially available from Stepan Oilfield Solutions of Houston, TX, cocamidopropyl betaine (CAPB), oleic acid amide propyl betaine (OAPB), erucamide propyl betaine (EAPB), cocamidopropyl hydroxyl sulfobetaine (CHSB), erucic acid amidopropyl-betaine (EDAB), Macat® brand amine oxides and betaines commercially available from Pilot Chemical Company of Houston, TX (MACAT), n-dodecyl-n,n-dimethyl-3-ammonio-1-propanesulfonate (DDAPS), or a combination thereof.

Foam stability can be enhanced by addition of polymers. Polymers in fracturing fluid formulations should come together with surfactants if the polymer itself is not a surfactant. The role of polymers in foam stabilization is as follows: a) adsorption on the gas-liquid interface reducing gas mobility which slows down foam coarsening, b) formation of 3D polymer structure due to inter- and intramolecular hydrogen bonds among polymer chains increasing fluid viscosity and decreasing drainage rate, c) water capture by hydrophilic polymer groups contributing to the decrease of drainage rate. Examples of polymers are guar and hydrolyzed polyacrylamide.

Foam can also be stabilized with nanoparticulate. Though, foam generation with nanoparticles can be complicated due to the electrical charges that particles usually bear Particles, being adsorbed on the interface, create large barriers for adsorption of other particles. This barrier is usually much larger than that created by ionic surfactant. To overcome this disadvantage, particles can be modified with surfactants. The mechanism of interaction between surfactant and nanoparticles depends on the type of surfactant and nanoparticle/surfactant ratio.

Note that effective stabilization with polymers and nanoparticles may benefit from surfactant application.

Some embodiments may experience the following advantages compared to continuous foam fracturing: 1) less risk of a screen out in case of foam collapse; and/or 2) ability to stimulate deeper wells with nitrogen. Some embodiments may experience the following advantages compared to traditional heterogeneous proppant placement techniques: 1) less damage to the proppant pack conductivity; 2) utilization of a lesser amount of water; 3) faster flowback; and/or 4) enhanced hydrocarbon production induced by gas.

Figure 3:
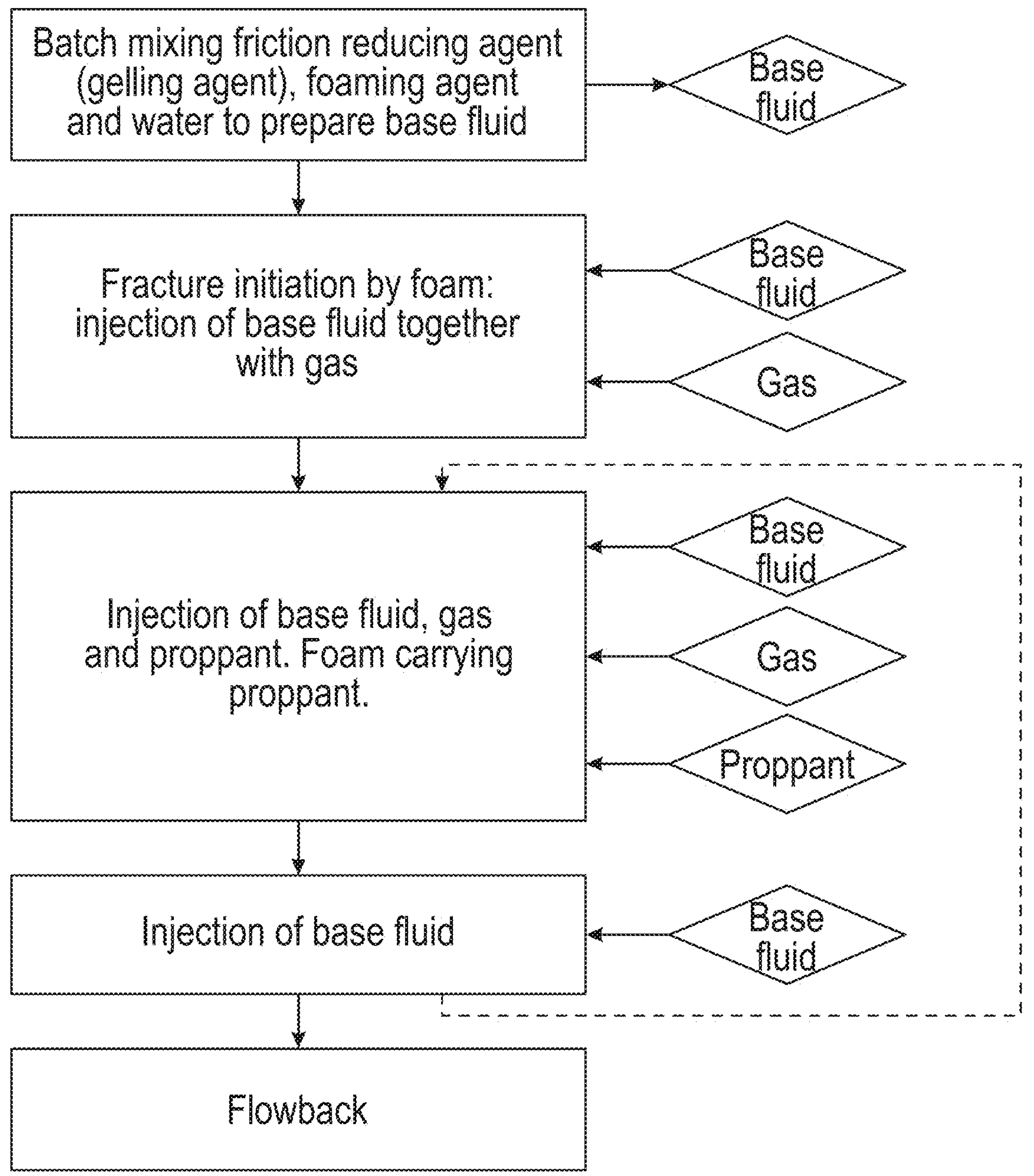
FIG. 3 is a workflow diagram of repeating the introduction of foam and base fluid into a formation, in accordance with certain embodiments of the present disclosure.

The workflow below is illustrated in FIG. 3.

Stage 1: Batch Mixing Gelling Agent, Foaming Agent and Water to Prepare Base Fluid Gelling agent, foaming agent and water are loaded into batch mixers featured with centrifugal pumps for delivering fluid to high-pressure pumps.

Stage 2: Injection of Base Fluid Together with Gas

Fracture initiation is started by injection of foam at high pressure. In some embodiments, one may initiate the fracture with pure liquids first and once the fracture is initiated the $N_2$ foam is then introduced. Due to rheology properties, foams facilitate fracture growth. Gas is pumped by the nitrogen pumps. Base fluid and nitrogen combine together at the wellhead.

Stage 3: Injection of Base Fluid, Gas, and Proppant

Proppant is added to the stream using POD blender. Proppant is kept suspended along the way to the fracture and within the fracture height due to foam rheology properties. Gas is pumped by the nitrogen pumps. A slurry of proppant and base fluid [are] is pumped by_a frac pump, nitrogen is pumped by a nitrogen pump. Gas and slurry combine at the wellhead.

Stage 4: Injection of Base Fluid

Proppant and gas delivery systems are switched off while injection of base fluid is kept going. In some embodiments, when $N_2$ gas rates are reduced, the fluid rates will often be brought up to maintain pressures and keep the fractures open during displacement.

Stage 5: Repeat Stage 3 and Stage 4 Several Times

Injection of the base fluid, proppant, and gas, as well as base fluid alone, are injected in series. The number of cycles is to be determined by target formation properties and expected economic outcome. This approach to deliver proppant is expected to create clean islands of proppant within the fracture, increasing fracture conductivity compared to regular proppant delivery or pulse proppant delivery using crosslinked gel for proppant suspension. Some embodiments may have a nearly even application of dirty and clean pulses over time. For example, 10 to 15 seconds of a clean fluid pulse followed by 10 to 15 seconds of a proppant-laden, "dirty" fluid. Some embodiments may use asymmetric pulses with 10 seconds of clean, 45 to 70 seconds of "dirty" with proppant, and then back to 10 seconds and repeat. Some embodiments may have $N_2$ pulses that are symmetric or asymmetric. Some embodiments may pulse the $N_2$ or defoamer, or both, in a similar fashion. Some embodiments may do this with pulsed or continuous proppant as well. A pulse of either fluid may be of at least 3 seconds, 5 to 300 seconds, 10 to 70 seconds, or 10 to 45 seconds, or some other time duration.

Stage 6: Injection of Base Fluid

The final stage of hydraulic fracturing is injection of base fluid to prevent proppant from coming out of the fracture. Practically speaking, in some embodiments, the last stage is to pump the base fluid to clear proppant and gasses from the wellbore. If proppant is left in the wellbore, it can make it difficult to re-enter the wellbore with tools such as wireline or coiled tubing devices. If gas is left in the wellbore, the hydrostatic head is removed, which can lead to well control issues.

Stage 7: Flow Back

Flowback is facilitated by gas injected at Stages 2, 3, and 5. Gas increases the rate of fluid flow and enhances the fracture cleanup from polymer residuals.

In accordance with certain embodiments of the present disclosure, a method for hydraulically fracturing a subterranean formation traversed by a wellbore includes mixing a gelling agent and water to form a base fluid, adding a gas and a proppant to the base fluid to form a foam fluid, alternatingly injecting into the formation the base fluid and the foam fluid, repeating the alternating injecting, forming regions of higher proppant concentration, and forming channels adjacent to the regions.

In some embodiments, a pulse of the foam fluid has a duration of about 5 to about 300 seconds. In some embodiments, a pulse of the base fluid has a duration of about 5 to about 300 seconds. In some embodiments, a gelling agent includes polyacrylamide, polyacrylamide derivatives, or combinations thereof. In some embodiments, the gelling agent includes guar, guar derivatives, viscoelastic surfactant, xanthan gum, hydroxyethyl cellulose, or a combination thereof. In some embodiments, the foam fluid further includes a foaming agent. In some embodiments, the foam fluid includes fibers. In some embodiments, the proppant includes silica sand, resin coated sands, sintered ceramic materials, fused synthetic ceramic materials, light-weight nut shells, or a combination thereof. In some embodiments, the proppant is coated. In some embodiments, the gas includes nitrogen. In some embodiments, the base fluid includes a foam stability control agent.

In accordance with certain embodiments of the present disclosure, a method for hydraulically fracturing a subterranean formation traversed by a wellbore includes forming a base fluid including a gelling agent, forming a foam fluid including a gas and a proppant, injecting into the formation the base fluid, injecting into the formation the foam fluid, repeating the injecting of the base fluid and the foam fluid; and forming channels in the base fluid with faster flow than flow in the foam fluid.

In some embodiments, the gelling agent includes polyacrylamide, polyacrylamide derivatives, guar, guar derivatives, or a combination thereof. In some embodiments, a pulse of foam fluid has a duration of about 5 to about 300 seconds. In some embodiments, a pulse of the base fluid has a duration of about 5 to about 300 seconds. In some embodiments, the gelling agent includes guar, guar derivatives, viscoelastic surfactant, xanthan gum, hydroxyethyl cellulose, or a combination thereof. In some embodiments, the foam fluid further includes a foaming agent. In some embodiments, the foam fluid includes fibers. In some embodiments, the proppant includes silica sand, resin coated sands, sintered ceramic materials, fused synthetic ceramic materials, light-weight nut shells, or a combination thereof. In some embodiments, the gas includes nitrogen.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

As used herein, the terms “up” and “down,” “uphole” and “downhole”, “upper” and “lower,” “top” and “bottom,” and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional “means-plus-function” clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words ‘means for’ appear together with an associated function. Each addition, deletion, and modification to the embodiments that falls within the meaning and scope of the claims is to be embraced by the claims.

The terms “approximately,” “about,” and “substantially” as used herein represent an amount close to the stated amount that still performs a desired function or achieves a desired result. For example, the terms “approximately,” “about,” and “substantially” may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to “up” and “down” or “above” or “below” are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as “means for [perform]ing [a function] . . . ” or “step for [perform]ing [a function] . . . ”, it is intended that such elements are to be interpreted under 35 U.S.C. 112(f). However, for any claims containing elements designated in any other manner, it is intended that such elements are not to be interpreted under 35 U.S.C. 112(f).

We claim:

1. A method for hydraulically fracturing a subterranean formation traversed by a wellbore, the method comprising:

injecting a base fluid into the subterranean formation, the base fluid comprising mixing a gelling agent and water; and injecting a foam fluid into the subterranean formation, the foam fluid comprising the gelling agent, water, a gas, and a proppant, wherein injection of the foam fluid alternates with injection of the base fluid via pulse injections of the base fluid and pulse injections of the foam fluid, wherein the pulse injections of the foam fluid have a duration from about 5 seconds to about 300 seconds and form agglomerated proppant regions, and wherein the pulse injections of the base fluid have a duration from about 5 seconds to about 300 seconds and form channels adjacent to the agglomerated proppant regions, the agglomerated proppant regions having a higher proppant concentration than the channels.

2. The method of claim 1, wherein the gelling agent comprises polyacrylamide, polyacrylamide derivatives, or any combination thereof.

3. The method of claim 1, wherein the gelling agent comprises guar, guar derivatives, viscoelastic surfactant, xanthan gum, hydroxyethyl cellulose, or any combination thereof.

4. The method of claim 1, wherein the foam fluid further comprises a foaming agent.

5. The method of claim 1, wherein the foam fluid further comprises fibers.

6. The method of claim 1, wherein the proppant comprises silica sand, resin-coated sands, sintered ceramic materials, fused synthetic ceramic materials, lightweight nut shells, or any combination thereof.

7. The method of claim 1, wherein the proppant is coated.

8. The method of claim 1, wherein the gas comprises nitrogen.

9. The method of claim 1, wherein the base fluid further comprises a foam stability control agent.

10. The method of claim 1, wherein the channels have a faster flowback than the agglomerated proppant regions.

11. The method of claim 10, wherein the gelling agent comprises polyacrylamide, polyacrylamide derivatives, guar, guar derivatives, or any combination thereof.

12. The method of claim 10, wherein the gelling agent comprises polyacrylamide, polyacrylamide derivatives, guar, guar derivatives, viscoelastic surfactant, xanthan gum, hydroxyethyl cellulose, or any combination thereof.

13. The method of claim 10, wherein the foam fluid further comprises a foaming agent.

14. The method of claim 10, wherein the foam fluid further comprises fibers.

15. The method of claim 10, wherein the proppant comprises silica sand, resin-coated sands, sintered ceramic materials, fused synthetic ceramic materials, lightweight nut shells, or any combination thereof.

16. The method of claim 10, wherein the gas comprises nitrogen.

17. A method for hydraulically fracturing a subterranean formation traversed by a wellbore, the method comprising:

initiating a fracture in the subterranean formation via injection of a fracture-initiation fluid comprising a gelling agent, water, and nitrogen gas;

injecting a base fluid into the subterranean formation after the fracture is initiated, the base fluid comprising the gelling agent and water; and injecting a foam fluid into the subterranean formation after the fracture is initiated, the foam fluid comprising the gelling agent, water, the nitrogen gas, and a proppant, wherein injection of the foam fluid alternates with injection of the base fluid via pulse injections of the base fluid and pulse injections of the foam fluid;

wherein the pulse injections of the foam fluid have a duration from about 5 seconds to about 300 seconds and form agglomerated proppant regions, wherein the pulse injections of the base fluid have a duration from about 5 seconds to about 300 seconds and form channels adjacent to the agglomerated proppant regions, the agglomerated proppant regions having a higher proppant concentration than the channels, the channels having a faster flowback than the agglomerated proppant regions, wherein the gelling agent comprises polyacrylamide, polyacrylamide derivatives, guar, guar derivatives, viscoelastic surfactant, xanthan gum, hydroxyethyl cellulose, or any combination thereof, wherein the foam fluid further comprises a foaming agent, fibers, or any combination thereof, wherein the proppant comprises silica sand, resin-coated sands, sintered ceramic materials, fused synthetic ceramic materials, lightweight nut shells, or any combination thereof, wherein the proppant is coated, and wherein the base fluid further comprises a foam stability control agent.

* * * * *